United States Patent Office 3,385,838
Patented May 28, 1968

3,385,838
METHOD FOR THE PREPARATION OF COPOLY-
MERS OF THE POLYSULFONIC TYPE AND COM-
POUNDS RESULTING THEREFROM
Georgette Steinbach-van Gaver, Paris, France, assignor
to Produits Chimiques Pechiney-Saint-Gobain, Neuilly-
sur-Seine, France
No Drawing. Filed Jan. 12, 1965, Ser. No. 425,063
Claims priority, application France, Jan. 15, 1964,
960,416
10 Claims. (Cl. 260—79.3)

ABSTRACT OF THE DISCLOSURE

Polysulphonic copolymers and a method for their production, the polymerization involving the known mixture of sulphurous anhydride, at least one unsaturated hydrocarbon of the alkene type, and at least one other unsaturated compound. The improved method producing the improved compounds involves copolymerization in the presence of an organic derivative of a metalloid selected from the group consisting of an aliphatic nitrated compound, aliphatic mercaptans, unsaturated organic sulphur compounds, and organic halogenated compounds.

SPECIFICATION

This invention relates to a method for the preparation of copolymers of the polysulphonic type and to compounds resulting therefrom.

It has previously been reported that copolymers of the polysulphonic type can be prepared on the basis of an unsaturated hydrocarbon, and of sulfurous anhydride, associated in substantially equimolecular proportions. These copolymers constitute thermoplastic compounds, however, the industrial applications of these compounds are limited, due to the fact that they have an insufficient thermal stability. It is also known that it is possible to improve the properties of these types of compounds, to a limited degree, by associating the following within a molecule of the interpolymer type: an unsaturated hydrocarbon, sulfurous anhydride and a third monomer, constituted by another unsaturated organic compound, usually called "termonomer."

Although certain one of the copolymers so prepared have interesting properties, it has now been found that it is possible to obtain polymer compounds of the polysulphonated type. Such compounds have properties which are substantially improved when compared to the presently available types.

It is a general object of this invention to provide polymer compounds of the polysulphonated types having properties which significantly increase the utility of the compounds.

It is a more specific object of this invention to provide an improved method for the preparation of compounds of the type set forth in the foregoing object.

These and other objects of this invention will appear hereinafter and it will be understood that the specific examples hereinafter set forth are provided primarily for purposes of illustrating the invention and not for the purpose of limiting the invention.

According to the present invention copolymers of the polysulphonated type are prepared by copolymerization of sulfurous anhydride, of at least one unsaturated hydrocarbon and of one other unsaturated organic compound.

The unsaturated hydrocarbon may be an alkene of the general formula $C_nH_{2n}$ wherein $n$ is greather than 2. The other unsaturated organic compound may comprise acrylonitrile introduced into molecular proportions below 0.5 with respect to the unsaturated hydrocarbon employed.

The copolymerization is effected in the presence of an organic derivate of a metalloid selected from the groups V, VI and VIIa of the periodic classification of elements. Preferably polymerization is carried out in the presence of an organic derivate of nitrogen, an organic derivate of sulfur or an organic halogenated derivate.

Among the organic nitrogen compounds which are used to good advantage in the method of this invention, the aliphatic nitrated compounds of the formula $C_nH_{(2n+1)}NO_2$, used in such a manner that the molecular ratio of the nitrogen compound with the total of the unsaturated compounds used is preferably between .1 and 1 percent, are particularly suitable.

With respect to suitable organic sulfur derivatives for the method of this invention, the aliphatic mercaptans of the general formula $C_nH_{(2n+1)}SH$, $n$ being between 6 and 20, and also the sulfides of the unsaturated organic compounds such as allyl and vinyl sulfides, are highly satisfactory.

These organic sulphur derivatives are used in amounts such that the molecular ratio of the organic sulphur compound to the total of the unsaturated organic compounds used is preferably between .01 and 5 percent.

Particularly suitable for use as the halogenated organic derivates in the method of this invention are allyl bromide, bromoform, iodoform, carbon tetrachloride, trichlorethylene, ethyl bromo malonate, benzene-sulfonyl chloride and chloracetaldehyde. These halogenated organic compounds are so used that their molecular ratio to the total of the unsaturated compounds used is preferably between .01 and 2 percent.

It is also preferable to employ in the reaction such a quantity of sulfurous anhydride that the molecular ratio of the sulfurous anhydride to the unsaturated organic compounds used is between 1 and 2. The copolymerization of the monomer compound defined above involves generally the use of conventional techniques and is usually carried out in the presence of a polymerization catalyst. In practice, the copolymerization is carried out at a temperature generally below 100° C., and preferably between 30 and 60° C. The operation generally lasts from 4 to 20 hours.

The copolymers prepared according to this invention possess considerably improved properties when compared to the copolymer compounds on the basis of unsaturated compounds and sulfurous anhydride prepared according to prior art. The technical progress achieved is great, in view of the fact that certain of these properties, such as the heat stability, the fluidity of the melted copolymers, and the transparency of the shaped objects, make it possible to expand considerably the possible applications of these compounds. The products so prepared are suitable for use in many applications now using thermoplastic compounds. They can be used to good advantage in a large number of industrial applications such as those originating from molding, injection and drawing in fibers.

The following examples will illustrate the method of the invention:

EXAMPLE 1

The following provides an illustration of a system wherein the copolymerization was carried out in an emulsion of butene-1, sulfurous anhydride and acrylonitrile in the presence of tertiododecyl mercaptan. The following ingredients were introduced successively at room temperature into a glass reactor which is provided with a mechanical agitator and a water circulation heating device, and which has previously been drained of the oxygen it contains:

| | |
|---|---|
| Water ml | 300.000 |
| Ammonium nitrate acting as copolymerization catalyst grams | .721 |
| Ammonium alkyl sulfonate, acting as emulsifier do | 9.050 |
| Butene-1 at 95 percent purity do | 82.000 |
| Sulfurous anhydride do | 152 |
| Acrylonitrile do | 18.560 |
| Tertiododecyl mercaptan do | 3.700 |

Under stirring the temperature of the reaction milieu increased to 48° C. with the pressure being about 9 kg./cm$^2$. The operation was continued at 48° C. for 6 hours and at the end of the operation the pressure was brought down to 2 kg./cm.$^2$. After degasification of the monomers which did not react, the copolymer emulsion was introduced into a solution of 15 grams of calcium chloride in 300 ml. of water at 50° C. The flocculated copolymer was filtered, washed in water until the washing water had a pH of 5, and it was then dried at 50° C. in an air circulation stove. The end product comprised 163 grams (that is a transformation ratio of 87 percent with regard to butene-1) of a copolymer having a centesimal analysis as follows:

| | Percent |
|---|---|
| Carbon | 41.7 |
| Hydrogen | 6.8 |
| Sulfur | 28.2 |
| Nitrogen | 1.4 |

The intrinsic viscosity of the copolymer was also measured in tetrahydrofurane (.6 gram of copolymer per 100 ml. of solvent at 25° C.). The viscosity measured under these conditions was 36 cc./gram.

Finally, the heat stability of the copolymer was measured by means of a thermoscale of the MacBain type. A sample of 15 mg. of copolymer in power form was subjected to heating at 194° C. under an air current and the relative loss of weight was determined at the end of 1, 2 and 3 hours of treatment. These losses in weight were 4.5, 8, and 12 percent, respectively.

The flow speed of the copolymers obtained with an apparatus designed in accordance with ASTM D1238–57T standard was also measured. The product was introduced in powder form into a steel cylinder heated to a constant temperature of 150° C. A piston moving in the cylinder applied a load of 10.463 kgs. and forced the melted copolymer to flow across a draw plate with a diameter of 2 mm. and a length of 8 mm. At regular intervals the mass of product discharged was measured and the flow speed, expressed in g./min., was .325. The copolymer thus prepared was then subjected to a molding test by injection at 200° C., without introducing any plastifier or stabilizer, at a pressure of 1,200 kg./cm.$^2$. The sample obtained was perfectly transparent and free from bubbles.

For the purpose of comparison, the following table lists the viscosities and losses of weight at 194° C. measured on copolymers prepared according to Example 1 as well as the same measurements made on two copolymers prepared according to prior art. Of the prior art illustrated, reference A is based on butene-1 and sulfurous anhydride, and reference B is based on butene-1, sulfurous anhydride and acrylonitrile.

TABLE I

| | Butene-1 (g.) | SO$_2$, (g.) | Acrylonitrile, (g.) | Tertiododecylmercaptan, (g.) | Intrinsic viscosity, (g.) | Percent of loss in weight at 194° C. | | |
|---|---|---|---|---|---|---|---|---|
| | | | | | | 1 hr. | 2 hr. | 3 hr. |
| A | 82 | 152 | | | 100 | 22 | 32 | 40 |
| B | 82 | 152 | 18.56 | | 45 | 12 | 20 | 23 |
| Example 1 | 82 | 152 | 18.56 | 3.7 | 36 | 4.5 | 8 | 12 |

This table shows particularly clearly that the copolymer prepared according to the invention has, with relation to the control copolymers provided for comparison, a much lower viscosity and weight loss at 194° C.

Furthermore, the prior art copolymers were subjected to the molding test by injection and, even when operating at the lowest possible temperature, they have very serious drawbacks (bubbles, coloration) originating from a considerable degradation.

For purposes of further comparison Table II lists the viscosities and losses of weight at 194° C., measured on a copolymer prepared according to Example 2 as well as the same measurements taken on the two copolymers of the prior art shown in Table I.

TABLE II

| | Butene-1, (g.) | SO$_2$, (g.) | Acrylonitrile, (g.) | Lauryl mercaptan, (g.) | Intrinsic viscosity, (g.) | Percent of loss in weight at 194° C. | | |
|---|---|---|---|---|---|---|---|---|
| | | | | | | 1 hr. | 2 hr. | 3 hr. |
| A | 82 | 152 | | | 100 | 22 | 32 | 40 |
| B | 82 | 152 | 18.56 | | 45 | 12 | 21 | 23 |
| Example | 82 | 152 | 18.56 | 3.7 | 35 | 6 | 10 | 13 |

EXAMPLE 2

This example illustrates the method of this invention wherein the copolymerization was effected in an emulsion of butene-1, sulfurous anhydride and acrylonitrile, in the presence of lauryl mercaptan.

Operation is carried out under the same condition as in the preceding example with the exception that the tertiododecyl mercaptan was replaced with 3.7 grams of lauryl mercaptan. 140 grams of dry copolymer were obtained, corresponding to a rate of transformation of 75%.

The centesimal analysis of the product was as follows:

| | Percent |
|---|---|
| Carbon | 42.15 |
| Hydrogen | 6.65 |
| Sulfur | 26.30 |
| Nitrogen | 1.75 |

The intrinsic viscosity of the copolymer in solution in tetrahydrofurane was 35 cc./gram and the losses of weight at 194° C. were 6, 10 and 13%, respectively, after 1, 2 and 3 hours. The speed of flow, measured under the conditions described in Example 1 was .327 g./min.

The molding test by injection of copolymer which was neither plastified nor stabilized produced favorable results as with the copolymer prepared according to Example 1.

Table II shows clearly that the copolymers prepared according to the invention have, with relation to the control copolymers mentioned for comparison's sake, a much lower viscosity and loss of weight at 194° C.

EXAMPLE 3

In the following example, the copolymerization was effected in an emulsion of butene-1, sulfurous anhydride and acrylonitrile, in the presence of allyl bromide. The same conditions as described in Example 1 were involved with the exception that the tertiododecyl mercaptan was replaced with .088 gram of allyl bromide.

135 grams of copolymer in dry condition were obtained corresponding to a rate of transformation of 72%. The centesimal composition of the product obtained was as follows:

| | Percent |
|---|---|
| Carbon | 42 |
| Hydrogen | 6.4 |
| Sulfur | 26.2 |
| Nitrogen | 2.0 |

Bromine, less than .1%.

The viscosity of the copolymer in solution in tetrahydrofurane was 27 cc./gram and the losses in weight at 194° C. were 5, 10 and 15 percent, respectively, after 1, 2 and 3 hours. The flow speed was .343 gram/min.

The molding test by injection of copolymer which was neither plastified nor stabilized, produced results favorably comparable to the results achieved with the polymer prepared according to Example 1.

For purposes of comparison, Table III lists the viscosities and losses of weight measured on the copolymer prepared according to Example 3 and the same measurements taken on the two prior art copolymers identified above in Example 1.

TABLE III

| | Butene-1, (g.) | $SO_2$, (g.) | Acrylonitrile, (g.) | Allyl Bromide, (g.) | Intrinsic Viscosity, (g.) | Percent of loss of weight at 194° C. | | |
|---|---|---|---|---|---|---|---|---|
| | | | | | | 1 hr. | 2 hr. | 3 hr. |
| A | 82 | 152 | | | 100 | 22 | 32 | 40 |
| B | 82 | 152 | 18.56 | | 45 | 12 | 20 | 23 |
| Example 3 | 82 | 152 | 18.56 | .088 | 27 | 5 | 10 | 15 |

This table clearly shows that the copolymers prepared according to this invention is characterized with regard to the control copolymers mentioned for comparison's sake, by a much lower viscosity and loss of weight at 194° C.

EXAMPLE 4

In this example the copolymerization is undertaken in an emulsion of butene-1, sulfurous anhydride and acrylonitrile in the presence of tertiododecyl mercaptan, using an autoclave of 10 liters. The following ingredients were introduced into the glass autoclave:

| | | |
|---|---|---|
| Water | liters | 3.00 |
| Ammonium nitrate | grams | 7.21 |
| Ammonium alkylsulfonate | do | 90.50 |
| Butene-1 | do | 820.00 |
| Sulfurous anhydride | do | 1520.00 |
| Acrylonitrile | do | 185.00 |
| Tertiododecyl mercaptan | do | 18.00 |

The operation was carried out under the same conditions as in Example 1 and 1590 grams of dry copolymer were obtained, corresponding to a rate of transformation of 85%. The centesimal analysis of the product was as follows:

| | Percent |
|---|---|
| Carbon | 41.2 |
| Hydrogen | 6.3 |
| Sulfur | 25.2 |
| Nitrogen | 1.4 |

The viscosity of the copolymer in solution in tetrahydrofurane was 35 cc./gram and the loss of weight at 194° C. was 4, 7.9, and 10 percent, respectively, after 1, 2 and 3 hours. The flow speed under the conditions of Example 1 was .325 g./min.

The molding test by injection of the crude copolymer produced results which compared favorably with the tests on the copolymer prepared according to Example 1.

It will be understood that various changes and modifications may be made in the method of this invention as well as in the novel compounds produced by the method which provides the characteristics of the invention without departing from the spirit thereof particularly as defined in the following claims.

That which is claimed is:

1. In a method for the preparation of copolymers of the polysulphonic type wherein there is first provided a mixture of sulfurous anhydride, at least one unsaturated hydrocarbon of an alkene type having the general formula $C_nH_{2n}$ with $n$ being greater than 2, and one other unsaturated organic compound, and thereafter copolymerizing said mixture at a temperature less than 100° C., the improvement wherein the copolymerization is carried out in the presence of an organic derivative selected from the group consisting of
   (a) an aliphatic mercaptan having the formula $C_nH_{(2n+1)}$—SH, $n$ being between 6 and 20,
   (b) an aliphatic nitrated derivative having the formula $C_nH_{(2n+1)}NO_2$,
   (c) an unsaturated organic sulfur compound selected from the group comprising allyl sulfide and vinyl sulfide,
   (d) and an organic halogenated compound selected from the group comprising allyl bromide, bromoform, iodoform, carbon tetrachloride, trichlorethylene, ethyl bromomalonate, benzene sulfonyl chloride and chloracetaldehyde.

2. A method in accordance with claim 1 wherein the molecular ratio of the aliphatic mercaptan to the unsaturated organic compounds is between 0.01 and 5.0 percent.

3. A method in accordance with claim 1 wherein the molecular ratio of the organic derivative compared to the unsaturated organic compounds is between 0.1 and 1.0 percent.

4. A method in accordance with claim 1 wherein the molecular ratio of the organic sulfur compound compared to the unsaturated organic compounds is between 0.1 and 5.0 percent.

5. A method in accordance with claim 1 wherein the molecular ratio of the halogenated organic compound compared to the total of the unsaturated organic compounds is between 0.01 and 2.0 percent.

6. A method in accordance with claim 1 wherein the molecular ratio of the sulfurous anhydride to the organic unsaturated compounds is between 1.0 and 2.0.

7. A method in accordance with claim 1 wherein the said other unsaturated organic compound comprises acrylonitrile and is employed in a molecular proportion of less than 0.5 with respect to the unsaturated hydrocarbon.

8. A method in accordance with claim 1 wherein the copolymerization is carried out between 30° and 60° C.

9. A method in accordance with claim 1 wherein the duration of operation of the copolymerization is between 4 and 20 hours.

10. In a composition of matter comprising copolymers of sulfurous anhydride, at least one unsaturated hydrocarbon of an alkene type having the general formula $C_nH_{2n}$ with $n$ being greater than 2 and one other unsaturated organic compound comprising acrylonitrile, the improvement wherein said composition contains at least one organic derivative selected from the group consisting of:
  (a) an aliphatic mercaptan having the formula $C_nH_{(2n+1)}$—SH, $n$ being between 6 and 20,
  (b) an aliphatic nitrated derivative having the formula $C_nH_{(2n+1)}NO_2$,
  (c) an unsaturated organic sulfur compound selected from the group comprising allyl sulfide and vinyl sulfide,
  (d) and an organic halogenated compound selected from the group comprising allyl bromide, bromoform, iodoform, carbon tetrachloride, trichloroethylene, ethyl bromomalonate, benzene sulfonyl chloride and chloracetaldehyde.

References Cited
UNITED STATES PATENTS

| | | | |
|---|---|---|---|
| 2,647,879 | 8/1953 | Sibley | 260—45.7 |
| 2,481,596 | 9/1949 | Irany et al. | 260—79.3 |
| 2,606,169 | 8/1952 | Roney | 260—79.3 |
| 2,705,227 | 3/1955 | Stamatoff | 260—45.95 |
| 2,765,295 | 10/1956 | Crouch et al. | 260—79.3 |

JOSEPH L. SCHOFER, *Primary Examiner.*

D. K. DENENBERG, *Assistant Examiner.*